(No Model.)
H. ROESKE.
METHOD OF AND APPARATUS FOR PURIFYING WATER.
No. 501,732. Patented July 18, 1893.
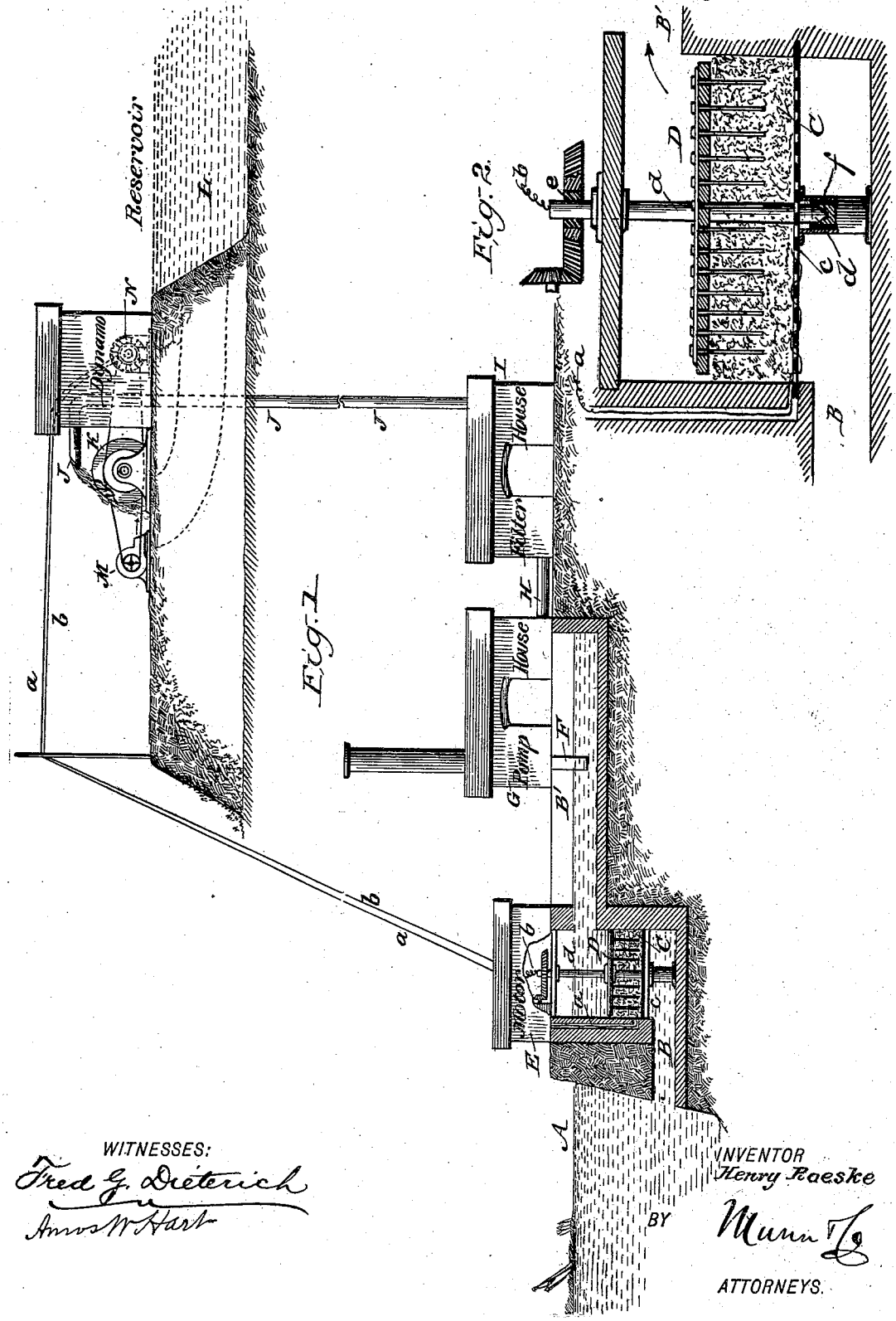
WITNESSES:
Fred G. Dieterich
Amos W. Hart
INVENTOR
Henry Roeske
BY Munn
ATTORNEYS.

UNITED STATES PATENT OFFICE.

HENRY ROESKE, OF PHILADELPHIA, ASSIGNOR OF ONE-HALF TO ROBERT WETHERILL & CO., OF CHESTER, PENNSYLVANIA.

METHOD OF AND APPARATUS FOR PURIFYING WATER.

SPECIFICATION forming part of Letters Patent No. 501,732, dated July 18, 1893.

Application filed October 15, 1892. Serial No. 449,011. (No model.)

*To all whom it may concern:*

Be it known that I, HENRY ROESKE, residing at Philadelphia, in the county of Philadelphia, in the State of Pennsylvania, have invented a new and Improved Method of and Apparatus for Purifying Water, of which the following is a specification.

For important sanitary reasons, the purification of water intended for drinking or culinary purposes is daily receiving more and more attention by municipalities, and practical methods or means for effecting the desired result upon a large scale have been widely discussed, and, in some instances, already adopted and used. I have devised a new and improved method and apparatus for this purpose. The former involves passing the water to be purified through a body of comminuted iron which is simultaneously agitated and subjected to the action of an electric current, the oxide thus rapidly formed and disengaged, or set free, mingling with the water and serving to precipitate the larger portion of its impurities, the remainder being removed by filtration. As a final step in the operation, the filtered water is areated before entering the distributing reservoir. The means, or apparatus, include a very economic construction and arrangement of parts, or elements, so that the plant may be set up and operated at comparatively small cost.

In accompanying drawings Figure 1, represents my improved apparatus partly in section, and Fig. 2 is an enlarged vertical section of the main portion of the same.

The water to be purified is taken from a lake, pond, river or other source of supply A, and enters a passage or conduit B, wherein it passes through a quantity of comminuted iron C, which is simultaneously agitated and also subjected to the action of an alternating electric current supplied by the circuit wires $a$ $b$, from a Westinghouse dynamo N. One ($a$) of the wires connects with the agitating device D, and the other ($b$) with the body of iron C. The latter is supported upon a perforated plate $c$ over which the agitator D is adapted to rotate. Said agitator is composed of a series of arms radiating from a vertical shaft $d$, and having a series of pendent iron or steel teeth or fingers, which move through the iron and stir the same as the shaft $d$ is rotated. This movement is imparted by an electric motor E which is connected with the agitator shaft by means of suitable gearing. The motor is driven by the current derived from the dynamo and which passes from the motor through the iron C and revolving rake D.

In further explanation of the details of the arrangement and operation of the electrical portion of the apparatus, I will state, that the wire, $a$, from the positive pole of the alternate dynamo, N, (which should be capable of discharging fifteen thousand alternating currents of one thousand volts in one minute,) connects with the iron shaft $d$, which is insulated from the bevel gear thereon, by means of a hard-rubber collar $e$, and also insulated from the step bearing below, by means of a hard-rubber socket $f$, as shown. The horizontal arms of said shaft may be of wood, capped with iron plates, or they may be wholly of iron. They are provided with a series of vertical holes to receive headed teeth which are set loosely therein, so that they may be easily withdrawn and new ones substituted, when required. The other conductor, $b$, connects with the perforated iron plate, $c$, on which the comminuted iron ore rests. It is apparent, that the alternating currents, from the dynamo pass through and polarize the iron particles, which work in frictional contact. When two metallic bodies are suspended in water containing any metallic salts, and a direct electrical current is passed through the water, the salts are split up into their component elements and the metal will be dissolved from the one body and deposited on the other. Alternate currents produce the same effect. It is however not noticeable for the reason that whatever is dissolved from the one body is deposited by the other, and the volume therefore remains. If now the two metallic bodies are in constant friction, as is the case in my apparatus, the deposition is hindered and the dissolved particles are carried away by the motion of the water. If a water does not contain metallic salts in sufficient quantity to produce this effect, it is pure enough for use as it is. I apply the alternate currents less for the promotion of dissolution of the iron, since this is sufficiently accomplished by the friction of the steel agitator and the softer iron filings; I use it more for the destruction of bacteria. Thus, the germs, bacteria, or microbes in the water are subjected to both an electrical and mechanical destructive action. I have demonstrated that, in this matter, my method is far superior in effect to that by which electrical currents are simply directed into and through the body of water to be purified. The alternating electrical currents also neutralize some acids in the water, for example, phosphoric and prussic acids. That is to say, the alternating current possesses the power to split up or decompose such acids, and the components are separated and carried away in the course of the subsequent agitation and aeration of the water. The electric current and the friction of the iron particles with each other when agitated by the rake D, promote oxidation of the metal and facilitate disengagement of the oxide which mingles with the water wherein it attracts foreign vegetable matter or impurities which are then for the most part precipitated upon the bottom of the conduit. The water current passes along the conduit B, and is drawn up the pendent tube F, by a suction and force pump (not shown) located at G, and by it forced through the horizontal tube H, into and through a suitable filter I, whence the purified water is forced up the reservoir pipe J, and discharged from its curved nozzle upon an overshot wheel K, and descends into the reservoir L. Contiguous to the said wheel K is placed a rotary fan M, which directs a blast of air against the falling water and thus aerates it to a high degree, which operation completes the process of purification.

It is obvious that other wheels may be substituted for the overshot wheel; for example, an undershot or breast wheel, or a turbine.

The pump by which the water is elevated and forced forward as above described, is preferably operated by a steam engine, located in the pump-house.

I prefer to use iron filings or other comminuted form of iron, but scraps and any other small iron pieces or plates may be used. It is obviously practicable to arrange and support the stratum or body of iron in other ways, and the water current may even be caused to flow over rather than directly upward through the mass. The agitation of the iron may also be accomplished by other means or methods than those described, and I do not desire to restrict myself to the precise means shown.

It will be seen that the delivery of the filtered water into the reservoir is made to serve as a means for driving the dynamo for generating the alternating electric current that drives the motor and also circulates through the stratum of iron—an economic advantage which is readily apparent.

Having thus described my invention, what I claim, and desire to secure by Letters Patent, is—

1. The method or process of purifying water which consists in passing it through a stratum or body composed of pieces of iron which is simultaneously agitated and subjected to the action of an electric current, then filtering the water to remove such impurities as were not precipitated by the oxide disengaged from the iron and mingled with the water, and finally aerating the filtrate, substantially as specified.

2. In purifying water the process or method consisting in passing water through a stratum or body of comminuted iron which is simultaneously agitated and subjected to the action of an electric current, then filtering the water to remove such impurities as were not precipitated by the oxide disengaged from the iron, substantially as specified.

3. In purifying water, the method or process which consists in passing water through a stratum or body of comminuted iron, in simultaneously agitating such stratum and subjecting it to the action of an electric current, substantially as shown and described, for the purpose specified.

4. In a water purifying apparatus, the combination with a water conduit and a quantity of comminuted iron supported therein, of an electric circuit of which the iron forms a part, and a means for agitating the iron, substantially as shown and described.

5. In a water purifying apparatus the combination with a water passage or conduit, and a quantity of comminuted iron supported or held therein of an electric circuit of which the iron forms a part, and a revolving rake composed of a shaft and radial arms having projecting teeth, which work in the iron and agitate the same, substantially as shown and described.

6. In an apparatus for purifying water, the combination of the conduit B, a perforated plate arranged therein, a stratum or body of comminuted iron supported upon said plate, the revolving iron rake arranged directly above the plate and working through the iron, and the electric circuit wires, one connecting with the rake and the other with the body of iron, as shown and described.

7. In an apparatus for purifying water, the combination, with the dynamo, of a water-wheel connected thereto by means suitable for effecting their simultaneous rotation a water-pipe discharging upon the water-wheel, an electric motor a body of comminuted iron, a device for agitating the latter, and an electric circuit from the dynamo through such motor and iron, and a pump connected with said pipe for forcing water through the same as shown and described.

8. An improved apparatus for purifying water, the same being composed of a conduit or passage, a stratum or body of comminuted iron arranged in such conduit, a means for agitating the iron, an electric circuit of which the iron forms a part, a pump for forcing the water forward, a filter, a pipe connecting said filter with the pump and a means for aerating the filtrate, substantially as shown and described.

HENRY ROESKE.

Witnesses:
HARRY B. YERGER,
A. G. SEYMOUR COOPER.